Patented Oct. 15, 1940

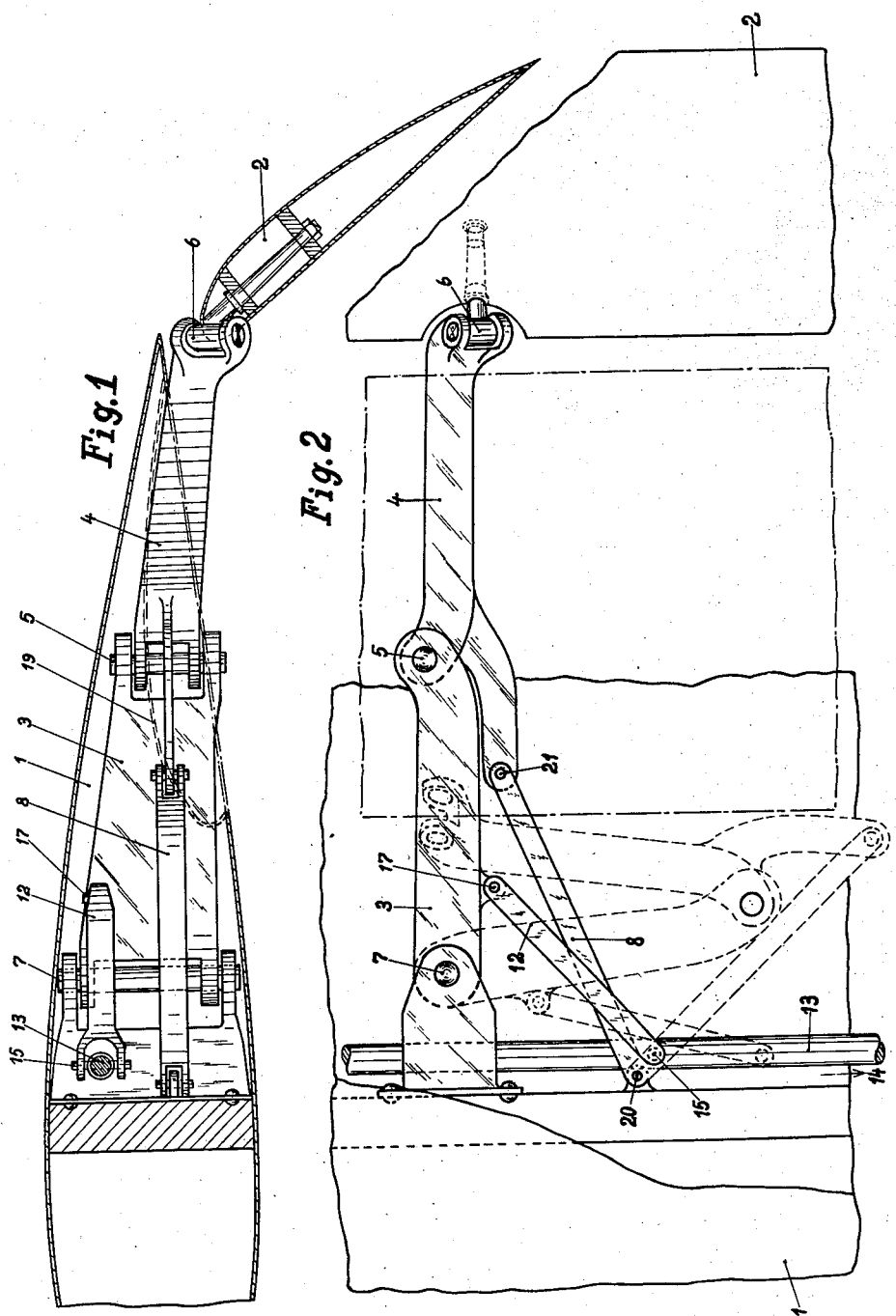

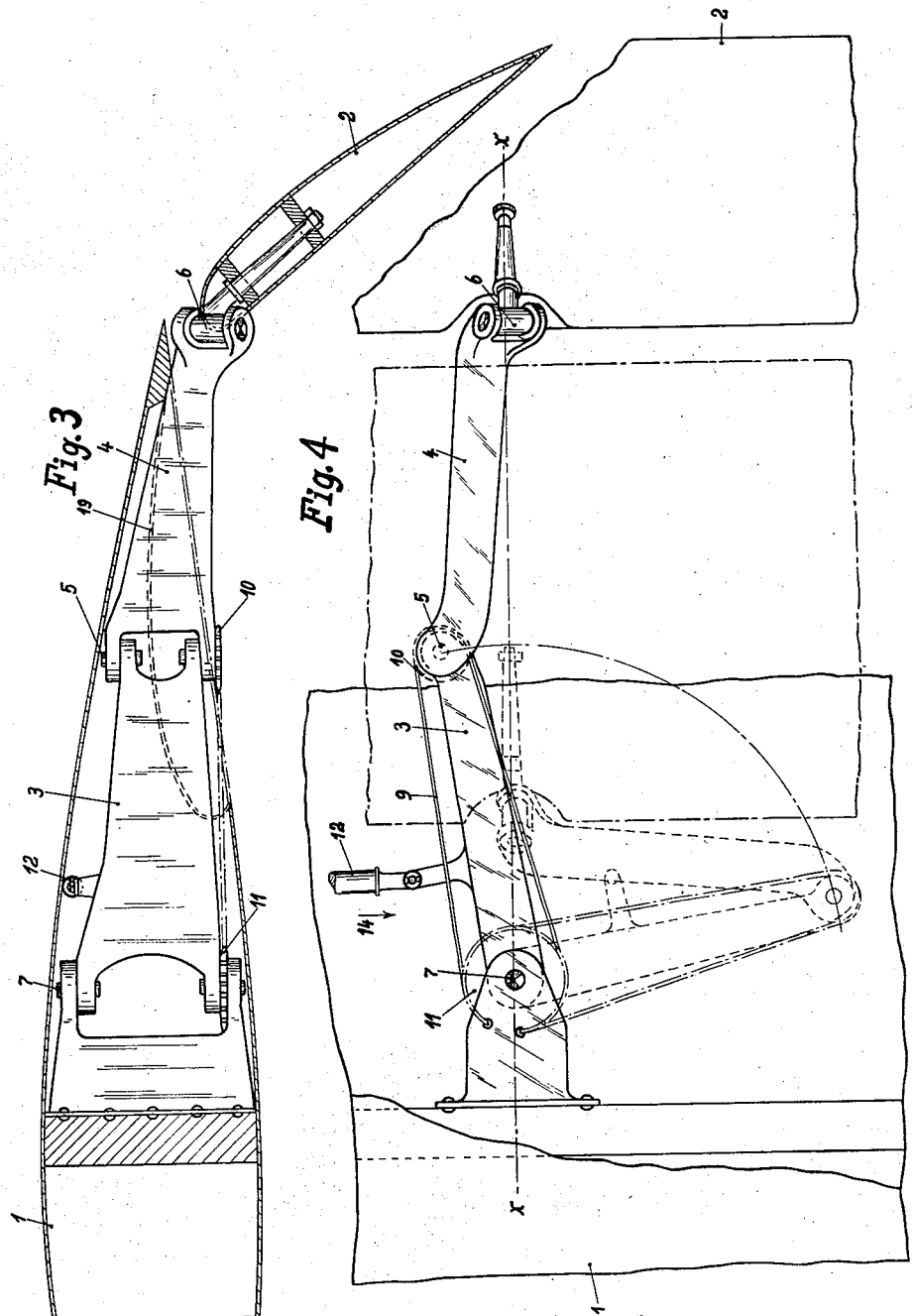

2,218,114

UNITED STATES PATENT OFFICE 2,218,114

OPERATING MECHANISM FOR AIRCRAFT WING FLAPS

Albert Kunze, Dessau, Germany, assignor to Junkers Flugzeug-und-Motorenwerke, Aktiengesellschaft, a corporation of Germany Application March 31, 1939, Serial No. 265,122
In Germany April 4, 1938

5 Claims. (Cl. 244—42)

The invention relates to aircraft wing units, consisting of a main wing and one or several auxiliary wings, permitting of being displaced (spreading and retracting) with respect to the main wing. There are known wing units of this kind, in which the auxiliary wing is hinged by means of universal joints to the one ends of pivot arms, which with their other ends are pivotally movably arranged at the main wing. During a touring flight the auxiliary wing is kept in the retracted position, being accommodated in a recess of the main wing, whereby the pivot arms holding the auxiliary wing extend approximately in the direction of the span. When adjusting the auxiliary wing to the spread position the pivot arms are swung out of this position in such a manner that their free ends perform an arc around the pivot axis of the pivot arms and in doing so are moved rearwards, whereby at the same time the auxiliary wing hinged at the free ends is displaced rearwards into the spreading position. If it is intended to attain by spreading of the auxiliary wing a considerable enlargement of the chord of the wing unit, the auxiliary wing must be moved rearwards by a considerable amount with respect to its position in a touring flight. This can be attained, with the known wing units of the kind described, only by the pivot arms, holding the auxiliary wing, being of comparatively great length, whereby the radius of the arc performed by their free ends, and in this way also the rearward displacement of the auxiliary wing, will become larger. However, owing to the swinging movement of the pivot arms, the auxiliary wing not only performs the desired displacement in rearward direction, but it is displaced at the same time in the direction of the span. This latter displacement is undesirable for constructional reasons and the method has already been adopted of fastening the auxiliary wing at guiding rods which at the main wing move in slide guides extending approximately in the direction of the flight. In this lay-out the auxiliary wing is slidable only in rearward direction without permitting of simultaneous lateral displacement. But even these guiding rods allow of displacement of the auxiliary wing only to a limited extent, since the space available in the interior of the main wing limits adjustment of the guide rods and, besides, it should be avoided as far as possible to arrange outside of the main wing guiding members unfavorably affecting the surrounding flow.

These disadvantages are avoided by the invention by having the auxiliary wing guided with respect to the main wing by toggle-joint levers, the one ends of which are hinged to the main wing and the other ends to the auxiliary wing. These toggle-joint levers require but small space during a touring flight owing to the position of the auxiliary wing, in which their two toggle-joint parts are arranged approximately alongside one another. There is nevertheless attained, as compared with the known pivot arms, about twice as large a spreading path for the auxiliary wing.

The arrangement according to the invention permits at least to easily avoid larger displacement of the auxiliary wing in the direction of the span, since guiding members of any kind may be provided preventing such lateral displacement. It will be advantageous to arrange as guiding member a directing member, one of the ends of which is movably connected to the main wing and the other end to that part of the toggle-joint lever, to which the auxiliary wing is hinged.

Another arrangement consists in having arranged at the common joint point of the two toggle-joint lever parts, with respect to toggle-joint lever part and hinged to the auxiliary wing, a non-rotating wheel-shaped body, which by means of a positive gear is coupled with a rolling-off body rigidly fixed in respect to the main wing. This further lay-out makes it possible to attain the swinging movement of the two toggle-joint lever parts towards one another with such characteristic that the auxiliary wing is subjected merely to a straight-lined displacement approximately in the direction of the flight.

The adjusting member causing the displacement of the auxiliary wing engages preferably that toggle-joint lever part, which is hinged to the main wing, so as to avoid in this manner constructional parts located in the air current.

The subject of the invention is represented in the illustrations in two modes of construction. There is shown in Fig. 1, a section through the wing unit in the direction of the chord of the wing unit, in which the auxiliary wing is shifted into the spread-out position, Fig. 2, a perspective view of the wing unit according to illustration 1, in which the upper limiting wall of the main wing has been left off in part for better discernibleness, Fig. 3, a section in the direction of the chord of the wing unit by a further mode of construction, in which the guiding of the auxiliary wing against lateral displacement is effected by a positively operating gear, Fig. 4, a perspective view of the wing unit according to illustration 3, in which the upper limiting wall of the main wing has been left off in part for better discernibleness.

The wing unit consists of the main wing 1 and the auxiliary wing 2, which during the touring flight is accommodated in a recess 19 at the lower side of the main wing 1 (position shown in dash-point line in the illustrations 1 and 3) and for the start or the landing is displaced (spread) with respect to the main wing 1 in the position indicated by full lines.

During the displacement the guiding of the auxiliary wing takes place by means of toggle-joint levers, consisting each of the levers 3 and 4, being flexibly connected with one another at 5. At the free ends of the toggle-joint lever, formed by the levers 3 and 4, is fastened the auxiliary wing 2 by means of the universal joint 6, whereas the other end of the toggle-joint lever is pivotally movably arranged at 7 at the main wing 1.

For the adjustment of the auxiliary wing from the position, shown in full lines, at the landing into the position of the touring flight a push rod 13 is displaced in the direction of the arrow 14 as shown in the mode of construction by illustrations 1 and 2. At the push rod 13 is hinged at 15 an adjusting member 12, which engages at 17 at the lever 3 of the toggle-joint lever. In the mode of construction, according to illustrations 3 and 4, engages in a similar manner in the said adjustment in the direction of the arrow 14 a slidable adjusting member at 18 at the lever 3 of the toggle-joint lever. Shifting the adjusting member 12 and 13, respectively, the toggle-joint lever is swung into the position indicated by dash line in the illustrations 2 and 4, in which the toggle-joint lever parts are located alongside one another and the auxiliary wing is accommodated in the recess 19 of the main wing 1. As shown by the illustrations 2 and 4, the parts 3, 4 of the toggle-joint lever require but little space in the touring flight position of the auxiliary wing 2, so that they can be placed without difficulty within the limitation of the total wing unit.

With the swinging movement of the toggle-joint lever the auxiliary wing 2 is moved in an approximateely straight plane extending in the direction of flight. This guidance is effected in the mode of construction according to illustrations 1 and 2 by means of the directing organ 8, one end of which is hinged at 20 to the main wing and the other end at 21 on the part 4 of the toggle-joint lever, with which the auxiliary wing 2 is connected. In this arrangement the path followed by the auxiliary wing during the displacement assumes a slightly S-curved form.

In the mode of construction according to the illustrations 3 and 4 the straight guiding of the auxiliary wing is attained by a positively operating gear in the following manner:

At the joint 5 of the toggle-joint lever parts 3 and 4 is arranged centrically to the axis of the joint a wheel-shaped body 10 which is non-rotating with respect to the part 4 of the toggle-joint lever. There is further provided centrically to the swing axis 7 of the toggle-joint lever part 3 fixed with respect to the main wing, a rolling-off body 11, arranged non-rotating with respect to the main wing 1. At the rolling-off body 11 is fixed a chain 9, engaging teeth of the wheel-shaped body 10. The chain, representing in conjunction with the rolling-off body and the wheel-shaped body 10 a positively operating gear, causes, in swinging the toggle-joint lever part 3, a rotating movement of the wheel-shaped body 10 and the non-rotatingly connected toggle-joint lever part 4 in such a manner, that the imaginary joint point of the universal joint 6 is displaced approximately on the line $x$—$x$.

From the modes of construction will be seen that the auxiliary wing 2 performs an approximately straight-lined displacement in the direction of the flight in a larger zone, without being simultaneously subjected to a larger displacement in the direction of the span and without the guiding members for the auxiliary wing, in particular in touring position of the latter, unfavourably affecting the surrounding flow of the wing.

What is claimed is:

1. In an airplane, a main wing, an auxiliary wing movable transversely with respect thereto into overlapping relation therewith, a first link pivotally connected at one end with the main wing about a fixed vertical axis, a second link connected with the auxiliary wing at one end and pivotally connected at the other about a vertical axis to the free end of said first link, operating means connected with the first link for swinging the same through substantially 90° about its fixed axis, and guide means connecting the main wing and said second link operable during swinging movement of the first link to maintain substantially straight-line movement of that end of the second link to which the auxiliary wing is connected, whereby movement of the auxiliary wing in the direction of the wing span is substantially precluded during movement thereof into and out of overlapping relation with the main wing.

2. The arrangement described in claim 1 wherein the guide means comprises a member pivoted to the main wing about a fixed axis at one end and at the other to a portion of the second link.

3. The mechanism described in claim 1 wherein the operating means comprises a member pivotally connected to the first link and movable in the direction of the main wing span.

4. The mechanism described in claim 1 wherein the second link is connected to the auxiliary wing through a universal joint.

5. The mechanism described in claim 1 wherein the auxiliary wing is connected to the second link through a universal joint mounted about an axis angular with respect to both the horizontal and the vertical.

ALBERT KUNZE.